May 17, 1938.  H. A. DOUGLAS  2,117,758
ELECTRIC LIGHTING DEVICE
Filed April 4, 1936  9 Sheets-Sheet 1
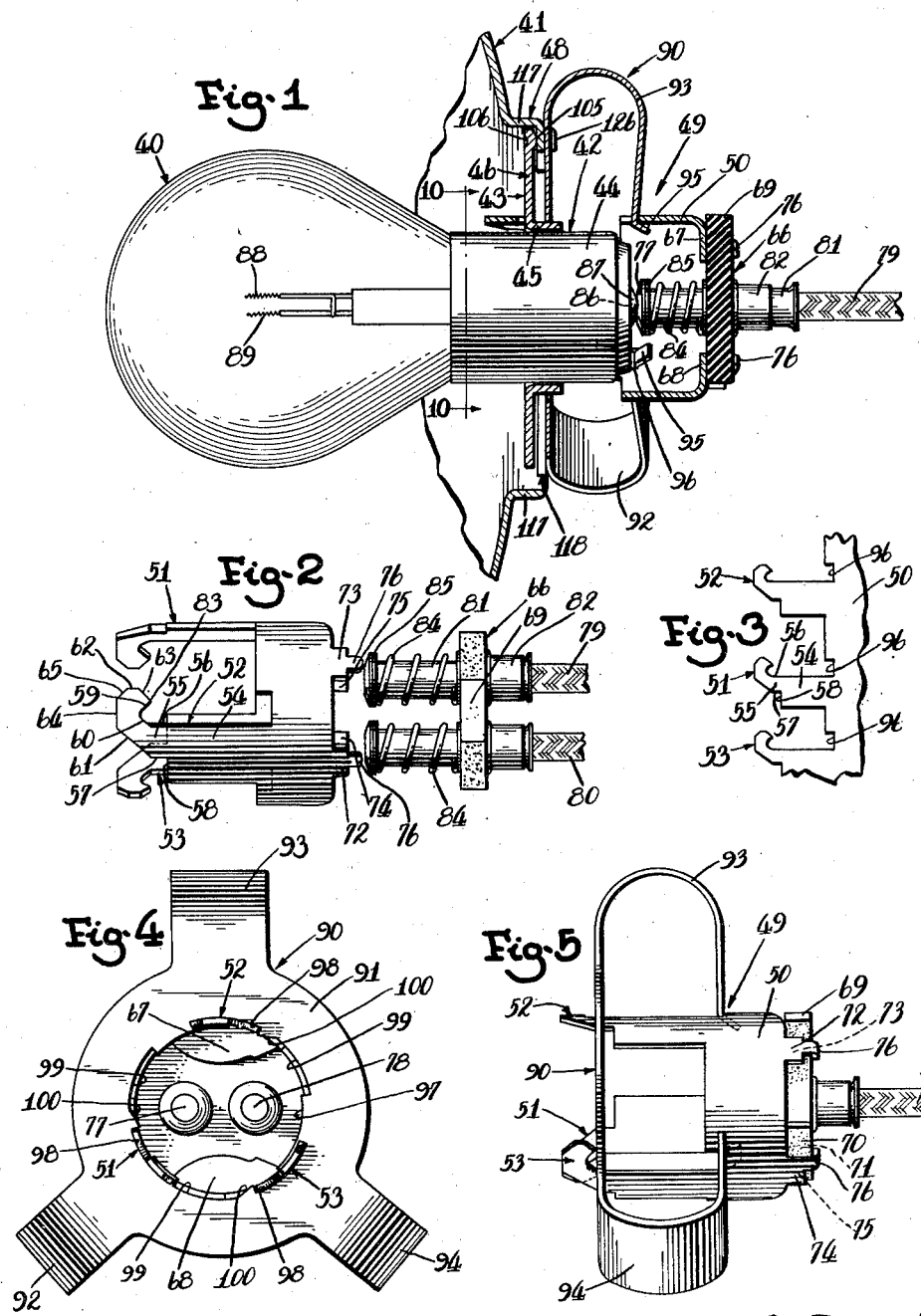
Harry A. Douglas
INVENTOR
BY Freeman, Sweet, Albrecht and Weidman
ATTORNEYS

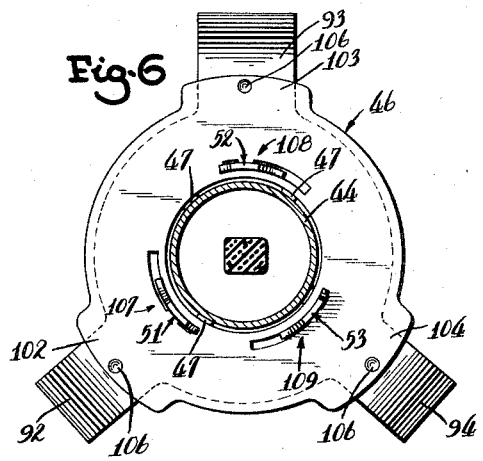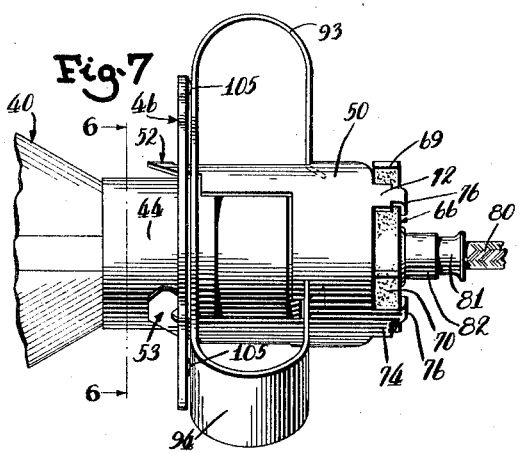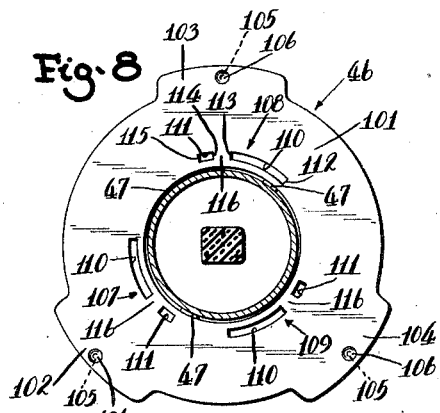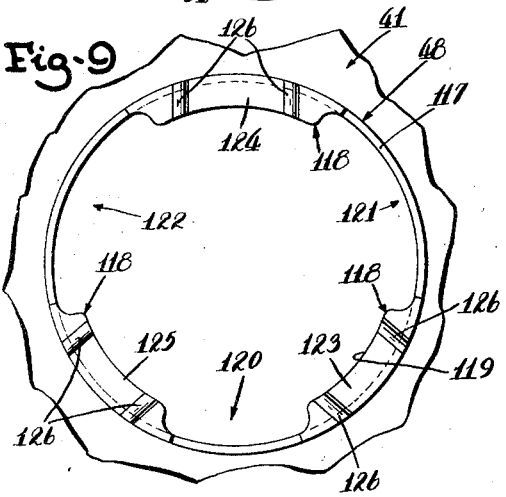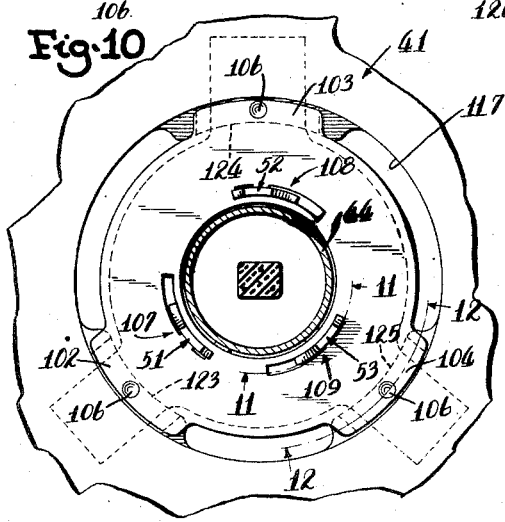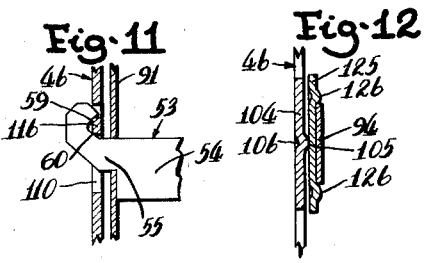

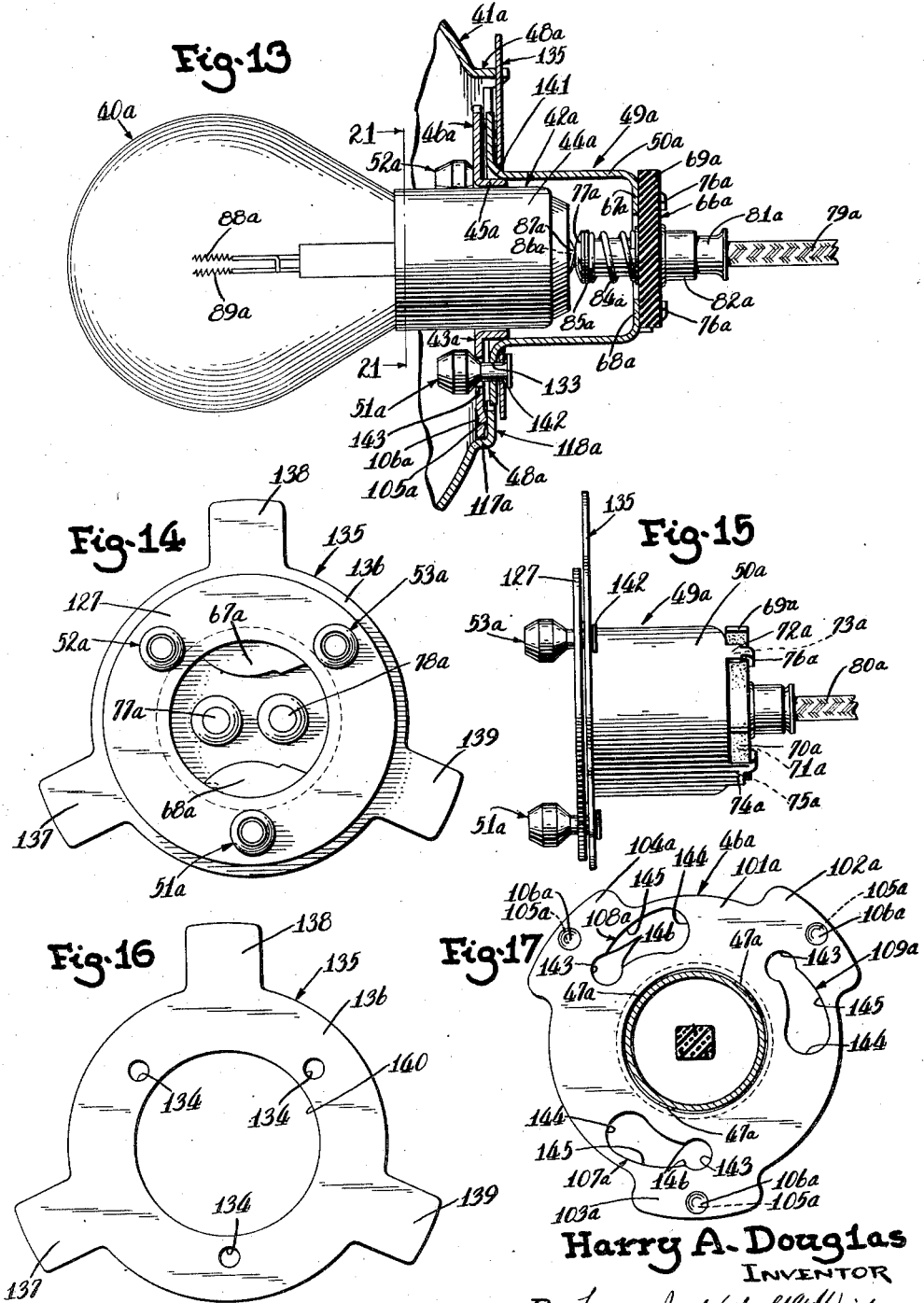

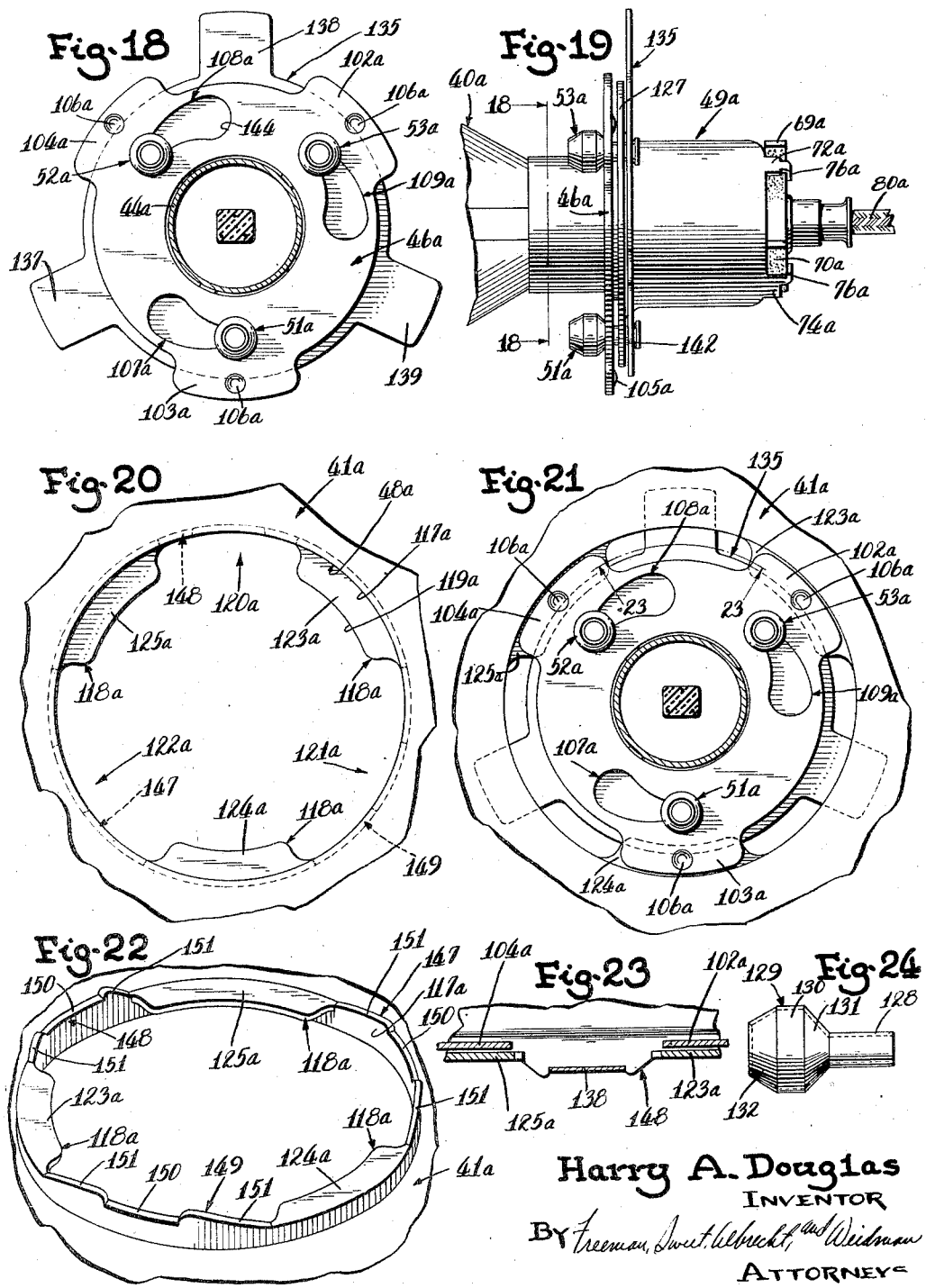

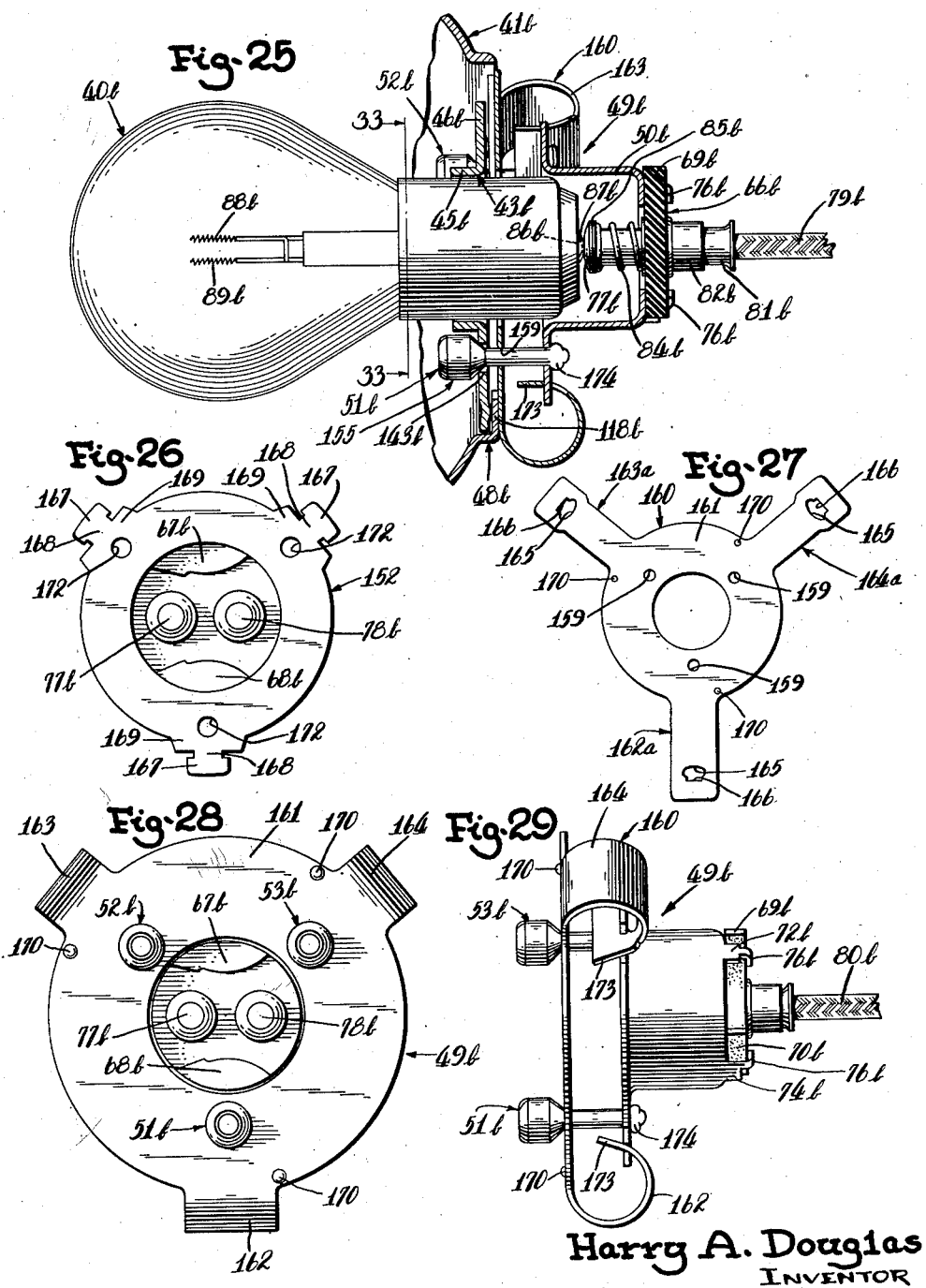

May 17, 1938. H. A. DOUGLAS 2,117,758
ELECTRIC LIGHTING DEVICE
Filed April 4, 1936 9 Sheets-Sheet 6
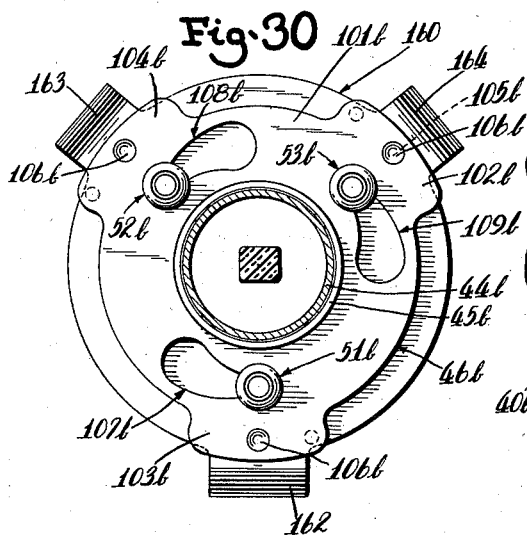
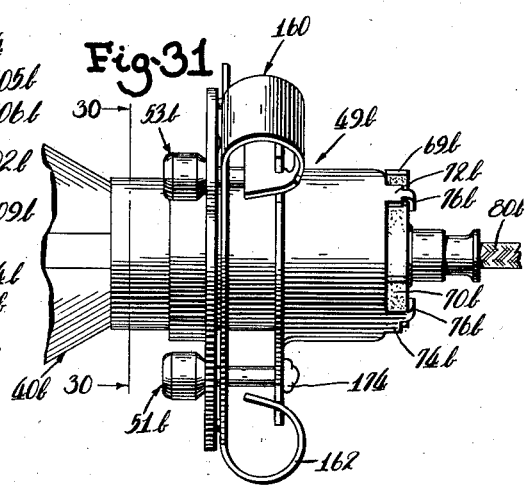
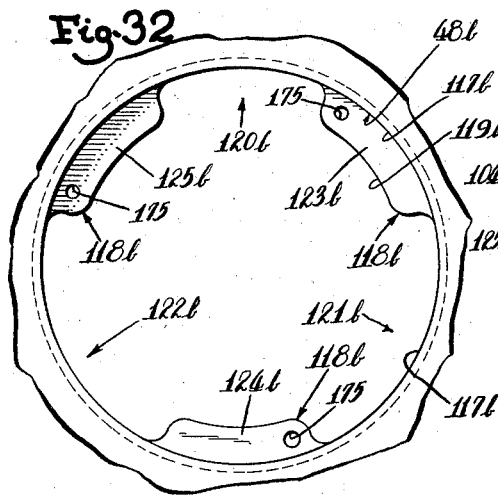
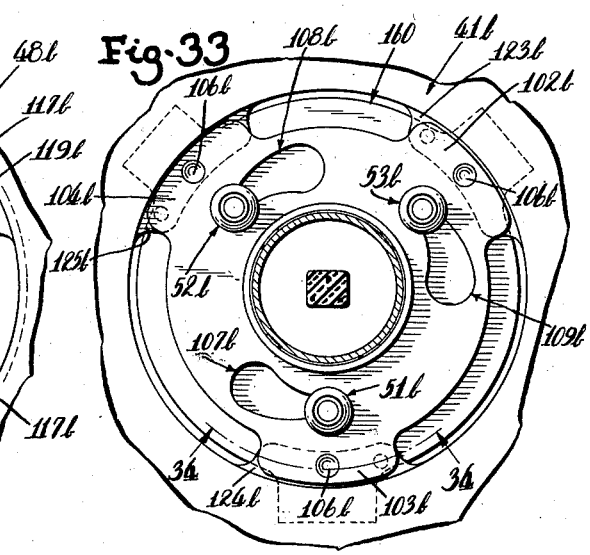
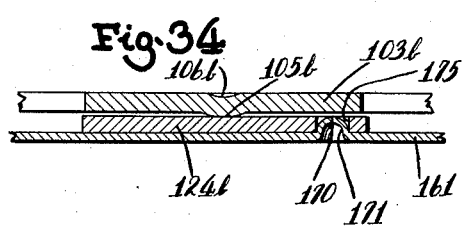
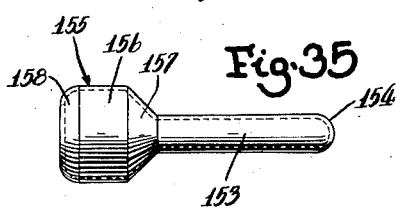
Harry A. Douglas
INVENTOR
ATTORNEYS

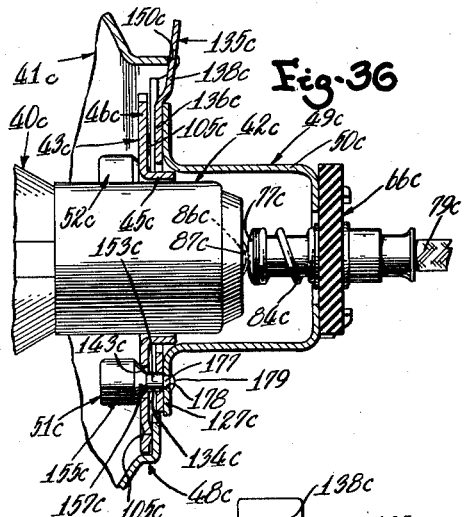
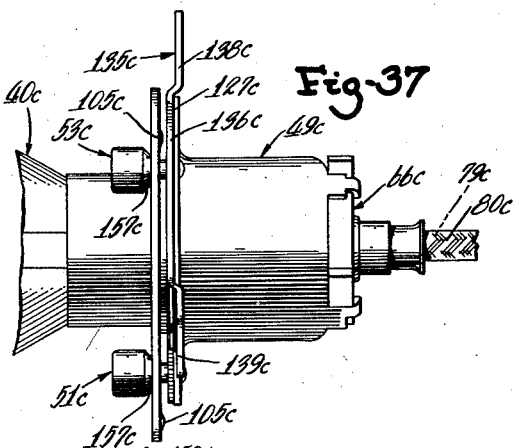
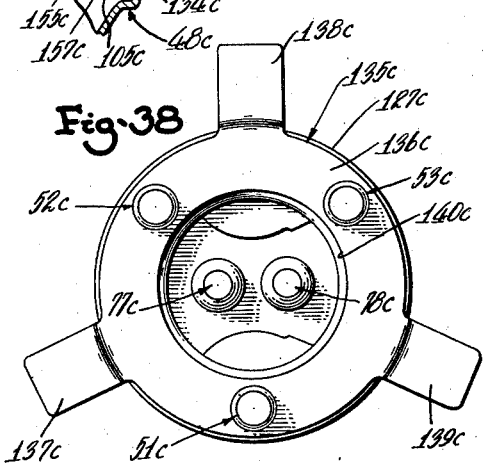
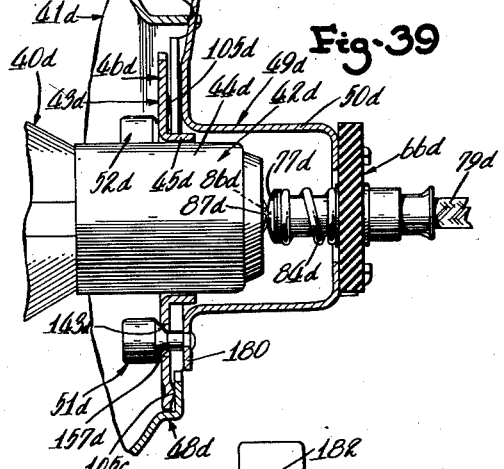
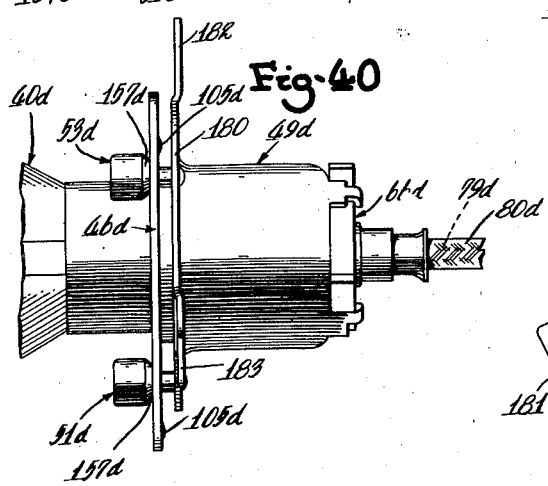
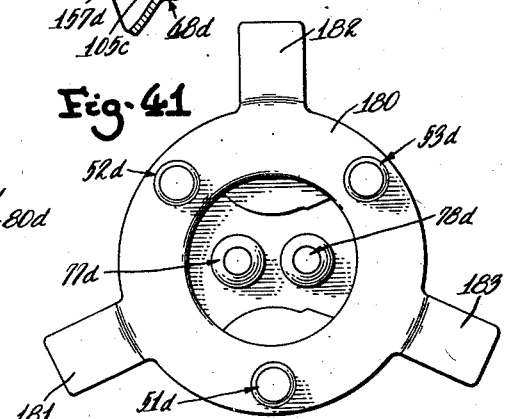

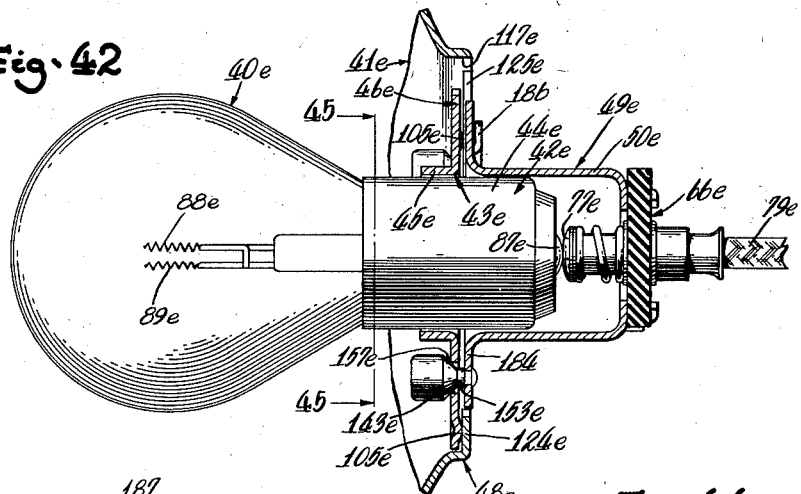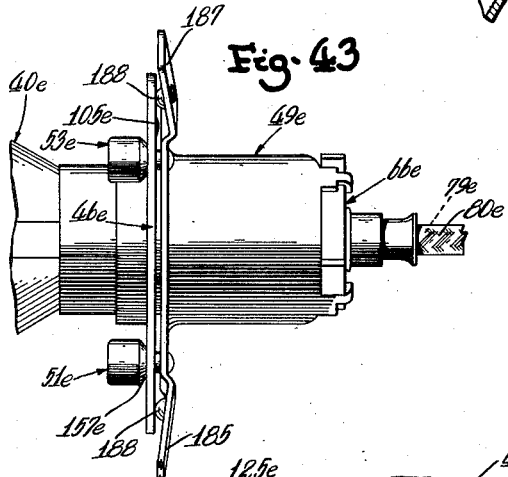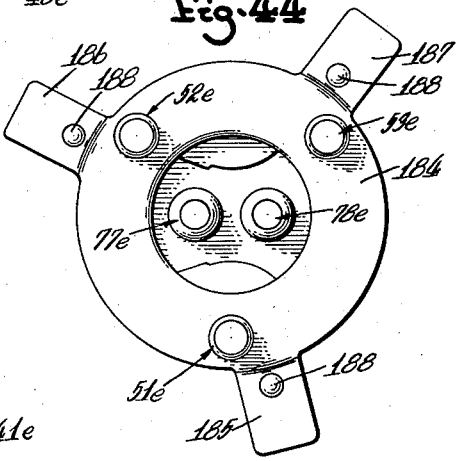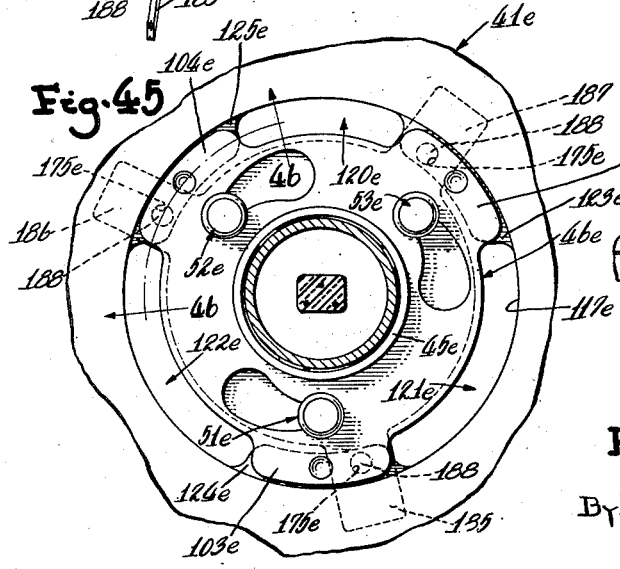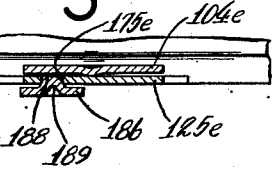

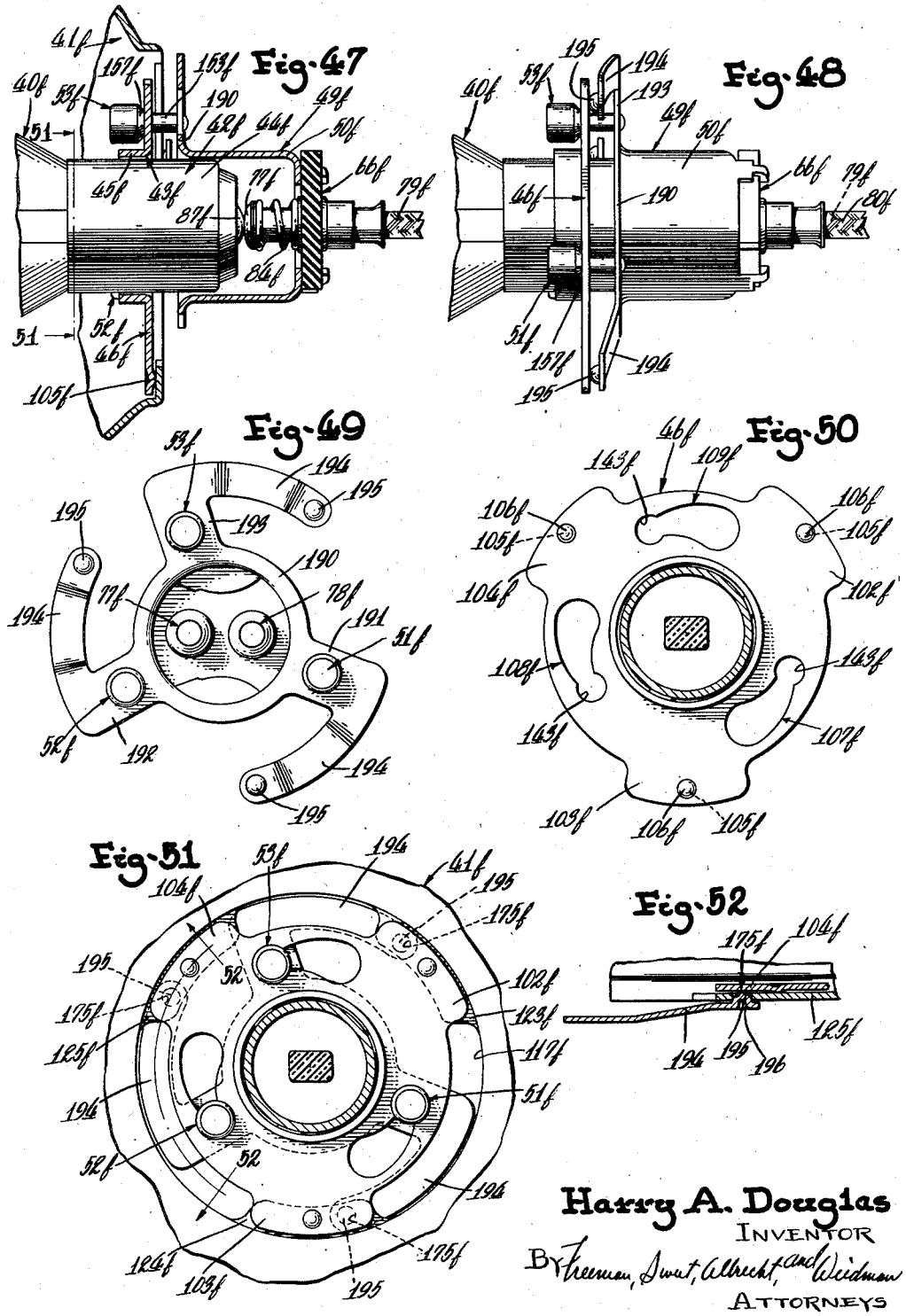

Patented May 17, 1938

2,117,758

UNITED STATES PATENT OFFICE 2,117,758

ELECTRIC LIGHTING DEVICE

Harry A. Douglas, Bronson, Mich., assignor to Kingston Products Corporation, a corporation of Indiana Application April 4, 1936, Serial No. 72,775

9 Claims. (Cl. 240—41)

My invention relates to electric lighting devices, and more particularly to electric lamp units comprising an incandescent electric lamp mounted in a reflector, as for example, in an automobile headlight, and the principal object of my invention is to provide a new and improved lighting device and unit of this type.

In the drawings accompanying this specification, and forming part of this application, I have shown, for purposes of illustration several forms which my invention may assume. In these drawings:

Figure 1 is a vertical sectional view, certain parts being fragmentarily shown, of one embodiment of my invention, Figure 2 is a plan view of some of the parts, shown in Figure 1, before they are completely assembled, Figure 3 is a fragmentary developmental detail view, on a smaller scale, Figure 4 is a front elevation of a holding means or socket unit, forming part of the embodiment shown in Figure 1, Figure 5 is a side elevation of the holding means shown in Figure 4, Figure 6 is a section taken along the line 6—6 of Figure 7, looking in the direction of the arrows, Figure 7 is a side elevation of a lamp and holding means, assembled, the lamp being fragmentarily shown, Figure 8 is a sectional view of a lamp, taken on the line 6—6 of Figure 7, the holding means shown in the latter figure being omitted, Figure 9 is a fragmentary rear elevation of a mounting, or reflector, which is used in the embodiment of Figure 1, Figure 10 is a section taken on the line 10—10 of Figure 1, looking in the direction of the arrows, Figure 11 is a fragmentary sectional view taken on the line 11—11 of Figure 10, looking in the direction of the arrows, Figure 12 is a fragmentary sectional view taken on the line 12—12 of Figure 10, looking in the direction of the arrows, Figure 13 is a vertical sectional view, certain parts being fragmentarily shown, of another embodiment of my invention, Figure 14 is a front elevation of a holding means or socket unit forming part of the embodiment shown in Figure 13, Figure 15 is a side elevation of the holding means shown in Figure 14, Figure 16 is a front elevation of a detail part of the embodiment of Figure 13, Figure 17 is a front elevation, partly in transverse section, of the electric lamp forming part of the embodiment of Figure 13, Figure 18 is a section taken along the line 18—18 of Figure 19, looking in the direction of the arrows, Figure 19 is a side elevation of a lamp and holding means, assembled, the lamp being fragmentarily shown, Figure 20 is a fragmentary front elevation of a mounting or reflector forming part of the embodiment in Figure 13, Figure 21 is a section taken along the line 21—21 of Figure 13, looking in the direction of the arrows, Figure 22 is a perspective rear view of the mounting or reflector of the embodiment of Figure 13, Figure 23 is a fragmentary sectional view taken along the line 23—23 of Figure 21, Figure 24 is a side elevation, on a larger scale, of a detail forming part of the embodiment of Figure 13, before assembly in that embodiment, Figure 25 is a vertical sectional view, certain parts being fragmentarily shown, of another embodiment of my invention, Figure 26 is a front elevation of a detail forming part of the embodiment of Figure 25, Figure 27 is a developmental view of a detail forming part of the embodiment of Figure 25, on a smaller scale, Figure 28 is a front elevation of a holding means or socket unit forming part of the embodiment of Figure 25, Figure 29 is a side elevation of the holding means shown in Figure 28, Figure 30 is a sectional view taken along the line 30—30 of Figure 31, looking in the direction of the arrows, Figure 31 is a side elevation of a lamp and holding means, assembled, the lamp being fragmentarily shown, Figure 32 is a fragmentary front elevation of a mounting or reflector forming part of the embodiment of Figure 25, Figure 33 is a section taken along the line 33—33 of Figure 25, looking in the direction of the arrows, Figure 34 is a fragmentary sectional view taken along the line 34—34 of Figure 33, on an enlarged scale, Figure 35 is a side elevation, on an enlarged scale, of a detail forming part of the embodiment of Figure 25, before assembly in that embodiment, Figure 36 is a vertical sectional view, certain parts being fragmentarily shown, of another embodiment of my invention, Figure 37 is a side elevation, partly fragmentary, of a lamp and holding means, used in Figure 36, assembled, Figure 38 is a front elevation of the holding means used in Figure 36, Figure 39 is a vertical sectional view, certain parts being fragmentarily shown, of another embodiment of my invention, Figure 40 is a side elevation, partly fragmentary, of a lamp and holding means, used in Figure 39, assembled, Figure 41 is a front elevation of the holding means used in Figure 39, Figure 42 is a vertical sectional view, certain parts being fragmentarily shown, of another embodiment of my invention, Figure 43 is a side elevation, partly fragmentary, of a lamp and holding means, used in Figure 42, assembled, Figure 44 is a front elevation of the holding means used in Figure 42, Figure 45 is a section taken on the line 45—45 of Figure 42, looking in the direction of the arrows, Figure 46 is a fragmentary section taken on the line 46—46 of Figure 45, looking in the direction of the arrows, Figure 47 is a vertical sectional view, certain parts being fragmentarily shown, of another embodiment of my invention, Figure 48 is a side elevation, partly fragmentary, of a lamp and holding means, used in Figure 47, assembled, Figure 49 is a front elevation of the holding means used in Figure 47, Figure 50 is a front elevation, partly in transverse section, of the lamp used in Figure 47, Figure 51 is a section taken on the line 51—51 of Figure 47, looking in the direction of the arrows, and Figure 52 is a fragmentary section taken on the line 52—52 of Figure 51, looking in the direction of the arrows.

Referring to Figure 1, the embodiment of my invention here illustrated is shown as including an incandescent electric lamp 40, adapted to be suitably connected to a mounting 41, the mounting being in this instance a reflector fragmentarily shown. The lamp 40 is provided with a base 42, which in this instance includes laterally extending positioning means 43 also forming part of the means for connecting the lamp to the reflector. The base 42 includes a shell 44, and the laterally extending portion of the base comprises a collar 45 surrounding the shell 44, and a radially extending flange 46 on the collar. The collar 45 may be fastened to the base 42 in any suitable manner, as by solder 47 (see Figure 8). The lamp flange 46 is adapted to be seated on the bottom of a rearwardly extending pocket 48 provided on the reflector 41, and a holding means 49, cooperating with the lamp flange 46, is provided for holding the lamp 40 assembled with the holding means 49 and with the reflector 41, as will more fully appear. By the term rearwardly, or rear, is meant in a direction away from the light source of the lamp 40, frontwardly, and front, of course, having the opposite significance.

The holding means comprises a shell 50, desirably of generally cylindrical form, which may be seamless and formed of sheet metal. The shell 50 is in this instance provided with a plurality of integral connector portions 51, 52, 53, unequally spaced circumferentially, extending in a direction generally parallel to the axis of the holding means 49. Each of the connector portions 51, 52, 53 is similarly formed and therefore a detailed description of one of them will serve for all. The connector portion 52, for example, comprises an axially extending bar 54 here shown as having parallel edges, the bar merging with a hook, the throat 55 of which is narrower than the circumferential width of the bar 54. The upper margin, 56, as viewed in Figure 2, of the throat 55 of the hook, where it merges with the bar 54, forms an axial extension of the upper margin of the bar, whereas the lower margin, 57, of the throat of the hook intersects a shoulder 58 formed at the end of the bar, the throat 55 of the hook being narrower than the bar 54. The hook has a mouth, the bottom sides of which are defined by converging lines 59, 60, forming a generally V-shaped recess, the bottom of which may be rounded off, as indicated. The end of the throat portion 55 of the hook may be beveled off, forming a beveled margin 61. The outer edge of the lip of the hook is defined by an axial line 62, and that portion of the lip of the hook merging with the inside of the mouth of the hook may be beveled off, to form a beveled edge 63, so that the apex 83 of the lip is formed by the lines 59, 63. The free end of the hook is defined by a line 64, in a plane transverse to the axis of the holding means 49. The chin of the hook may also be beveled, to form a beveled margin 65.

The holding means 49 serves also to carry an insulating member 66, an outside diameter of which is approximately equal to the inside diameter of the shell 50, adapted to abut diametrically opposite segmental flanges 67, 68 extending radially inwardly from the rear end of the shell 50. The insulating member 66 is further provided with a plurality of circumferentially spaced radial projections, in this instance three, two of which 69, 70, may be seen in Figure 5, for example, and a third of which, 71, is located at the other side of the member 66, analogously to the projection 70. On opposite circumferential sides of the projection 69 are disposed two rearwardly extending projections 72, 73 on the shell 50. Immediately below the projections 70, 71, as viewed in Figure 5, the shell 50 is provided with the respective rearward projections 74, 75. The space between the projections 74, 75 is less than the space between the projections 72, 73. The projections 72, 73, 74, 75, and the projections 69, 70, 71 may be arranged in any other suitable manner, so that the insulating member 66 and the shell 50 may be assembled in but one relative rotative relation. In order to hold the insulating member 66 to the shell 50, the projections 72, 73, 74, 75 are provided with fingers 76, which may be clinched radially inwardly over the rear face of the insulating member 66.

The insulating member 66 is adapted to carry contacts 77, 78, these contacts being desirably formed as enlarged heads on shanks fitted over and swedged to the ends of conductors 79, 80 respectively. The conductors 79, 80 are disposed in sleeves 81, the sleeves being slidable within bushings 82, which are fixedly mounted, in any suitable manner, as by beading, through the insulating member 66. Springs 84 surround the sleeves 81 between the bushings and flanges 85, on the front ends of the sleeves, abutting the contacts 77, 78.

The contacts 77, 78 are adapted to make contact respectively with a pair of contacts 86, 87 on the base of the incandescent lamp 40. The contact 86, directly behind the contact 87 in Figure 1, is the contact which engages the spring pressed contact 77, visible in that figure. The provision of the plurality of contacts on the lamp base enables the use of a multiple filament lamp, the lamp being here shown as provided with two filaments 88, 89, one of which, 88, may desirably have its lighting center at some predetermined point with respect to the reflector, as for example the focus, and the other of which, 89, may be displaced from the filament 88 and may be used for providing dim light or so-called tilted light. The filaments 88, 89 have their terminals connected in a well known manner to the lamp base 42 and to the contacts 86, 87 on the lamp base. The passage of current to either one or both of the filaments 88, 89 may be controlled in any suitable manner by switching means (not shown) interposed in the conductors 79, 80.

The holding means 49 also includes a biasing means 90, in this instance comprising a ring 91 of sheet metal, provided with portions, circumferentially unequally spaced, extending in a generally radial direction outwardly from the ring, and looped or bent radially inwardly so as to form the spring loops 92, 93, 94. The free ends of the spring loops may be reduced in width, to form tongues 95, adapted to be received respectively in a plurality of recesses 96 which may be formed in the front margin of the shell 50. The recesses 96 are unequally spaced circumferentially to accommodate the unequal spacing of the spring loops 92, 93, 94. The spring loops 92, 94 are spaced less than 120° apart, and these loops are here shown as of the same width but each is narrower than the spring loop 93.

The ring 91 has a central aperture 97 of approximately the same diameter as the circle defined by the inner peripheries of the connector portions 51, 52, 53. The aperture 97 is provided with a plurality of compound auxiliary apertures or recesses, which form radial extensions of the central aperture 97. These compound apertures are circumferentially unequally spaced, and as they are identical, but one of them will be specifically described. Each compound aperture comprises a narrow or seat portion 98 having radial margins spaced circumferentially a distance slightly greater than the throat 55 of one of the hooks of the connector portions 51, 52, 53. Each compound aperture further comprises a wider or entrance portion 99 having a radially outer circumferential margin which may if desired be narrower circumferentially than the distance between the longitudinal margins 57, 62 of one of the hoks. The seat portion 98 and the entrance portion 99 are separated by a cam surface 100, extending from the clockwise margin of the seat portion 98 to the radially outer circumferential margin of the entrance portion 99.

It will be evident that the hooks of the connector portion 51, 52, 53 may be inserted in an axial direction through the entrance portions 99 of the compound apertures of the ring 91, until the shoulders 58 abut the rear face of the ring 91, whereupon the shell 50, and therefore the hooks, may be turned in a counterclockwise direction, as viewed in Figure 4, whereupon the leading edges of the throats 55 of the hooks will engage the cams 100, thereby causing the hooks to be moved radially inwardly, the connector portions 51, 52, 53 being resilient enough for that purpose. Further rotation in a counterclockwise direction will bring the trailing edges of the throats 55 of the hooks beyond the crests of the cams 100, whereupon the hooks will snap radially outwardly into the seat portions 98, to the position shown in Figure 4. The spring loops 92, 93, 94 may then be flexed and the tongues 95 inserted in the recesses 96. The assembled holding means, unassembled with the lamp 40, or reflector 41, then has the appearance shown in Figures 4 and 5. It will be evident that the apexes 83 of the lips of the hooks are in contact with the front face of the ring 91, the ring being pressed against these apexes by the action of the spring loops 92, 93, 94.

The lamp flange 46 comprises a portion 101, of generally circular outline, and a plurality of radially extending sectoral projections, desirably three, 102, 103, 104. The peripheral arcs of the sectoral projections are here shown as equal, but the projections are circumferentially unequally spaced, the lower projections, 102, 104, as viewed in the drawings, being less than 120° apart, and the upper projection, 103, being so positioned that its axis of symmetry bisects the angle between the axes of symmetry of the lower projections, 102, 104. Each sectoral projection 102, 103, 104 is here shown as being provided with an axially rearwardly extending projection 105, conveniently formed by forming a depression 106 in the front face of the sectoral projection.

For cooperation with the hooks of the connector portions 51, 52, 53, the lamp flange 46 is provided with a plurality of compound apertures 107, 108, 109, adapted to receive the hooks. Each compound aperture comprises a set of two apertures, and since all of the apertures are identical, but one of them will be described. The aperture 108, for example, comprises a larger portion 110 and a smaller portion 111, these portions in this instance being separate from each other. Both the larger aperture 110 and the smaller aperture 111 have a radially outer circumferential edge and a radially inner circumferential edge, defined by arcs concentric with the lamp base 42, and of the same or substantially the same radius of curvature as the outer and inner peripheries of the hooks of the connector portions 51, 52, 53. The circumferential ends of the larger aperture are defined by radial lines 112, 113, while the circumferential ends of the smaller aperture 111 are defined by radial lines 114, 115. The adjacent lines 113, 114 form between them a generally radially extending portion 116 which is of such circumferential width as to be receivable in the bottom 59, 60 of the mouth of the hook of the connector portion 52, for example. Thus, the edges 113, 114 are adapted to engage the V-shaped recess formed by the edges 59, 60 of the bottom of the mouth of the hook of the connector 52. The compound apertures 107, 109, in a manner described in connection with the aperture 108, also form radially extending portions 116 adapted to cooperate with the hooks of the connector portions 51, 53, in a manner similar to that described in connection with the radially extending portion 116, left by the compound aperture 108, and the hook of the connector portion 52. The radially extending portions 116 are desirably so positioned that they are in radial alinement with the axial projections 105 respectively and of course are circumferentially unequally spaced to accord with the spacing of the hooks of the connector portions 51, 52, 53.

The reflector pocket 48 has a cylindrical portion 117 and a plane bottom or end flange 118 which is fragmentary in form. The end flange 118 has a central aperture 119 which is slightly larger than the circle defining the periphery of the portion 101 of the lamp flange 46. The end flange 118 is fragmentarily cut away to form radially extending recesses 120, 121, 122. These recesses leave the end flange 118 in the form of three flat segmental end flanges 123, 124, 125, the front surfaces of which, at least, define a single plane. The lower recess, 120, as viewed in Figure 9, for example, is slightly wider circumferentially than one of the sectoral projections 102, 103, 104 of the lamp flange 46, and the end flanges 123, 125 are of substantially the same circumferential width as the sectoral projections 102, 104. However, the end flange 124 is somewhat wider than the flanges 123, 125, and also is somewhat wider than the space between the sectoral projections 102, 104. Furthermore, the end flanges 123, 124, 125 are so positioned that in one relative rotative relation as between the lamp 40 and the reflector 41, the axes of symmetry of the sectoral projections 102, 103, 104 on the lamp flange 46 will register with the axes of symmetry of the end flanges 123, 124, 125. The diameter of the inner periphery of the cylindrical portion 117 of the pocket 48 is here shown as slightly larger than the diameter of the circle defining the outer peripheries of the sectoral projections 102, 103, 104 of the lamp flange, but the cylindrical portion of the pocket may gage, that is, snugly fit the outer peripheries of the sectoral projections, when the axial projections 105 are seated on the end flanges 123, 124, 125.

The plane of the rear faces of the end flanges 123, 124, 125 is in the same plane as the flangeless portions of the rear end of the cylindrical portion 117, the end flanges 123, 124, 125 are shown as each provided, on their rear faces, with a pair of parallel, generally radially extending ridges 126. The sides of the ridges desirably serve as cam surfaces. The space between the respective pairs of ridges 126 and the space between the ridges of a given pair, are so selected that the recesses, formed by the pairs of ridges, on the rear faces of the end flanges 123, 124, 125, will serve as snugly fitting seats for the spring loops 92, 93, 94.

The procedure in assembling the lamp 40 with the holding means 49 is as follows. The hooks of the connector portions 51, 52, 53 are brought into registry with the wider portions 110 of the compound apertures 107, 108, 109 in the lamp flange 46 and the hooks and flange are moved axially with respect to each other, against the bias of the contacts 77, 78, so that the ends of the hooks pass through the wider apertures 110, whereupon the rear face of the flange 46, and more particularly, the axial projections 105, come into abutment with the front faces of the spring loops 92, 93, 94. The holding means 49 and the lamp 40 are now turned about their axes in such direction relatively to each other that the beveled portions 63 of the hook lips engage the radial edges 113 of the larger aperture portions 110 of the compound apertures 107, 108, 109 of the lamp flange. The resulting cam action will pull the hooks further through the lamp flange 46, against the bias of the biasing means 90. Continuance of the relative rotative movement of the lamp 40 and holding means 49 will cause the apexes 83 of the lips of the hooks to ride over the front faces of the radially extending portions 116, and then the apexes 83 of the hook lips will snap respectively into the smaller aperture portions 111 of the compound apertures 107, 108, 109 of the lamp flange. The lamp 40 and holding means 49 are now completely assembled and have the position shown in Figures 6 and 7. In that position the sides 59, 60 of the hook mouth straddle the radial portion 116 of the lamp flange, those sides being in contact with the edges 114, 113 respectively of the radial portion 116. The front face of the biasing means 90 of course is pressed toward the rear face of the flange 46.

The assembled lamp, 40, and holding means, 49, now constitute a unit which is adapted to be in turn assembled with the reflector 41, as follows. The unitary lamp and holding means, shown assembled as a unit in Figures 6 and 7, are brought into axial alinement with the aperture 119 in the reflector 41, with the bulb of the lamp 40 facing the rear of the reflector, the bulb of the lamp is passed through the reflector aperture 119, and the unit is rotationally so positioned that the sectoral projection 104 may be passed through the recess 120. In this position the sectoral projections 102, 103, 104 will of course be in a position to pass through the recesses 121, 122, 120 respectively. The lamp and holding means unit is then moved axially toward the reflector until the front surfaces of the spring loops 92, 93, 94 abut the rear margin of the cylindrical portion 117. The lamp and holding means unit is then moved still further axially, against the bias of the biasing means 90, until the rear face of the lamp flange 46 is in front of the front faces of the end flanges 123, 124, 125. The lamp and holding means unit are then rotated in a clockwise direction, viewing the reflector from the rear, whereupon the spring loops slide over the leading ridges of the pairs of ridges 126, rotation being discontinued when the trailing edges of the spring loops 92, 93, 94 snap off of those ridges. The spring loops 92, 93, 94 then are disposed between the pairs of ridges 126, and the axial projections 105 on the lamp flange 46 bear, in this instance, against the approximate circumferential centers of the end flanges 123, 124, 125. The position of these parts is then as shown in Figures 1, 10, 11, and 12.

It will be evident that the biasing means 90 biases the shell 50 and the hooks of the connector portions 51, 52, 53 rearwardly and consequently the hooks press the flange 46 toward the end flanges 123, 124, 125. Since the lamp flange 46 is accurately pre-positioned with respect to its distance from the filaments 88, 89, and the direction of the plane of the flange 46 is pre-positioned with respect to the axis of the lamp 40, and furthermore, since the spring loops 92, 93, 94, in cooperation with the pairs of ridges 126 accurately determine the position of the lamp 40 about its axis with respect to the reflector 41, the filament 88, and also the auxiliary filament 89, will be positioned at the desired places with respect to the reflector. It will be noted, moreover, that the lamp flange 46 cannot be passed through the reflector upside down because the end flange 124 cannot be straddled by the sectoral projections 102, 104.

The flange 46 may be pre-positioned by assembling the lamp with the positioning means 43 and placing the positioning means 43 on a standard with the shell 44 within the collar 45 and then adjusting the lamp until the lighting center of the desired filament thereof is in a predetermined position, whereupon the collar 45 is soldered to the shell 44. The position of other filaments of the lamp may be likewise simultaneously predetermined.

It will be noted that, since the axial projections 105 are unequally circumferentially spaced, and the spring loops are similarly spaced, the projections 105 might be pressed against the end flanges 123, 124, 125 with undesirably unequal force if the spring loops were of equal strength. This inequality may desirably be equalized by making the spring loops 92, 94 each of less width, and therefore of less strength, than that of the spring loop 93.

When it is desired to disconnect a lamp 40 from the reflector 41, the lamp 40 and holding means 49 are turned as a unit with respect to the reflector until one or the other of the projections 102, 104 on the lamp flange 46 is brought into registry with the recess 120, whereupon the lamp 40 and holding means 49 may be removed as a unit by axial movement with respect to the reflector.

The lamp 40 may be removed from the holding means 49 by turning the lamp about its axis in a counterclockwise direction, as viewed in Figure 6, whereby the edges 114 of the radial portions 116, by cam action against the sides 59 of the bottoms of the hook mouths, force the hooks frontwardly with respect to the biasing means 90, against the bias of the biasing means, thereby permitting disengagement of the lamp, as will be evident.

Referring now to the embodiment shown in Figures 13 through 24. In this embodiment an incandescent electric lamp 40a is also adapted to be connected to a mounting or reflector 41a. The lamp 40a is provided with a base 42a, which in this instance includes laterally extending positioning means 43a also forming part of the means for connecting the lamp to the reflector 41a. The base 42a includes a shell 44a, and the laterally extending portion of the base 42a comprises a collar 45a, surrounding the shell 44a, and a radially extending flange 46a on the collar. The collar 45a may be fastened to the shell 44a in any suitable manner, as by solder 47a (see Figure 17). The lamp flange 46a is adapted to be seated on the bottom of a rearwardly extending pocket 48a provided on the reflector 41a; and a holding means 49a, cooperating with the lamp flange 46a, is provided for holding the lamp 40a assembled with the holding means 49a and with the reflector 41a, as will more fully appear.

The holding means 49a comprises a shell 50a, desirably of generally cylindrical form, which may be seamless, and desirably formed of sheet metal. At its front end the shell 50a is provided with an annular radial flange 127, which carries a plurality of concentrically arranged unequally circumferentially spaced connector pins 51a, 52a, 53a, desirable three.

The connector pins 51a, 52a, 53a, are all identical and therefore a detailed description of one of them will serve for all. An enlarged view of one of the connector pins is shown in Figure 24, as it appears before assembly with the holding means 49a. Each connector pin has a cylindrical shank 128, which before assembly with the flange is of uniform cross-section. At the front end each connector pin is provided with a head 129 having a cylindrical portion 130, the cylindrical portion being joined to the shank 128 by a frustroconical portion 131. The free end of the head 129 is here shown as also provided with a frustroconical portion, 132. The connector pins 51a, 52a, 53a, may be hollow as indicated in Figure 24.

The shanks 128 of the pins 51a, 52a, 53a are snugly but slidably disposed through apertures 133 in the flange 127, and are similarly disposed through registering apertures 134 in a biasing means 135, here shown as an annulus 136 of spring sheet metal having three radially outwardly extending ears 137, 138, 139. The lower ears 137, 139, as viewed in the drawings, are spaced somewhat more than 120° apart, and the upper ear, 138, is here shown as so disposed that its axis of symmetry bisects the angle between the axes of symmetry of the lower ears 137, 139. The annulus 136 has a central aperture 140 which is here shown as of such diameter that when the biasing means 135 is slipped over the shell 50a toward the flange 127, the front margin of the aperture 140 will abut a fillet 141 joining the flange 127 and shell 50a, the biasing means 135 being consequently spaced somewhat from the rear face of the flange 127. The connector pins 51a, 52a, 53a may be held assembled with the flange 127 and the biasing means 135 by forming a lateral extension at the rear ends of the shanks 128, as by flaring out the free ends of the shanks to form the flared portions 142.

The shell 50a is here shown as carrying contacts 77a, 78a, constructed and arranged the same as the contacts 77, 78 of the embodiment of Figures 1 through 12, and associated with the shell 50a in the same manner as are the contacts 77, 78 with the shell 50, and hence requiring no further description. The contacts 77a, 78a are cooperable with contacts 86a, 87a, carried by the lamp base 42a, and these contacts serve to electrically connect conductors 79a, 80a, to filaments 88a, 89a, as in the case of the embodiment of Figures 1 through 12, and hence also require no further description.

The lamp flange 46a comprises a portion 101a of generally circular outline, and a plurality of radially extending sectoral projections 102a, 103a, 104a, desirably three. The peripheral arcs of the sectoral projections 102a, 103a, 104a are here shown as equal, but the sectoral projections are circumferentially unequally spaced, the upper projections, 102a, 104a, as viewed in the drawings, being less than 120° apart, and the lower projection 103a being so positioned that its axis of symmetry bisects the angle between the axes of symmetry of the upper projections 102a, 104a. Each sectoral projection 102a, 103a, 104a is here shown as being provided with an axially rearwardly extending projection 105a, conveniently formed by forming a depression 106a in the front face of each sectoral projection, the projections 105a being here shown as located on the axes of symmetry of the sectoral projections.

For cooperation with the connector pins 51a, 52a, 53a, the lamp flange 46a is provided with three circumferentially spaced compound apertures 107a, 108a, 109a, unequally spaced to correspond to the unequal spacing of the connector pins. The compound apertures 107a, 108a, 109a are here shown as disposed in the portion 101a of the lamp flange. Each compound aperture 107a, 108a, 109a comprises an arcuate smaller or seat portion 143, and an arcuate larger or entrance portion 144, circumferentially spaced from the seat portion 143, the seat and entrance aperture portions being joined by a connecting portion 145 tapering from the entrance portion 144 to the seat portion 143. The margins of the connecting portion 145 are, in this instance, arcuate and generally tangent to the entrance portion 144, while the junction between the connecting portion 145 and the seat portion 143 is narrower than the diameter of the circle defined by the seat portion, thus forming humps 146 at the junction. The centers of the seat portions 143 are here shown as on the respective radii intersecting the projections 105a.

The reflector pocket 48a has a cylindrical portion 117a and a plane bottom or end flange 118a which is fragmentary in form. The end flange 118a has a central aperture 119a which is slightly larger than the circle defining the periphery of the portion 101a of the lamp flange 46a. The end flange 118a is fragmentarily cut away to form radially extending recesses 120a, 121a, 122a. These recesses leave the end flange 118a in the form of three flat segmental end flanges 123a, 124a, 125a, the front surfaces of which, at least, define a single plane. The upper recess, 120a, is slightly wider circumferentially than one of the sectoral projections 102a, 103a, 104a, of the lamp flange, and the end flanges 123a, 124a, 125a are of substantially the same circumferential width as the sectoral projections. Furthermore, the end flanges 123a, 124a, 125a are so positioned that in one relative rotative relation as between the lamp 40a and the reflector 41a, the sectoral projections 102a, 103a, 104a on the lamp flange will register with the said end flanges. The diameter of the inner periphery of the cylindrical portion 117a of the pocket is here shown as slightly larger than the diameter of the circle defining the outer peripheries of the sectoral projections 102a, 103a, 104a of the lamp flange, but the cylindrical portion of the pocket may gage, that is, snugly fit the outer peripheries of the sectoral projections, when the axial projections 105a are seated on the end flanges 123a, 124a, 125a.

For cooperation with the ears 137, 138, 139 on the biasing means, the reflector 41a is provided with three axially rearwardly extending ears 147, 148, 149. The inner peripheries of the ears 147, 148, 149 are here shown as forming continuations of the cylindrical surface defining the inner peripheral cylindrical surface of the portion 117a of the reflector pocket. At their free ends the ears 147, 148, 149 are provided with axial recesses 150, the seats of which are of such width and position as to be complementary to the ears 137, 138, 139 of the biasing means, when the sectoral projections 102a, 103a, 104a on the lamp flange are in registry with the end flanges 123a, 124a, 125a of the pocket. The recesses 150 in the reflector ears are approached on both sides, from the rear faces of the end flanges 123a, 124a, 125a, by rearwardly inclined portions 151, of the reflector ears, forming cam surfaces.

The lamp 40a may be assembled with the holding means 49a as follows. The entrance portions 144 of the compound apertures 107a, 108a, 109a are brought into registry with the heads 129 of the connector pins 51a, 52a, 53a, the lamp flange 46a being slipped over the heads 129, against the bias of the spring pressed contacts 77a, 78a, until the rear face of the lamp flange is in contact with the front face of the flange 127. The lamp 40a is then rotated clockwise, as viewed in Figure 18, thereby causing interengagement of the margins of the tapering portions 145 of the compound apertures 107a, 108a, 109a and the frustro-conical portions 131 of the heads 129 of the connector pins. Further clockwise rotation of the lamp 40a causes the frustro-conical portions 131 to pass the humps 146 and snap into the seat portions 143. The parts then have the position shown in Figures 18 and 19.

The assembled lamp 40a and holding means 49a now constitute a unit which is adapted to be in turn assembled with the reflector 41a. The unitary lamp and holding means are brought into axial alinement with the aperture 119a in the reflector, with the bulb facing the rear of the reflector, the unit is rotationally so positioned that the sectoral projections 102a, 104a will straddle the end flange 123a and the lamp is moved axially forward through the reflector aperture 119a, the sectoral projections 102a, 103a, 104a passing respectively through the recesses 121a, 122a, 120a, and the front faces of the ears 137, 138, 139 coming into contact with the rear faces of the end flanges 125a, 123a, 124a. The unit is then moved frontward sufficiently, meanwhile flexing the biasing means 135, so that the sectoral projections 102a, 103a, 104a will clear the end flanges 123a, 124a, 125a. The lamp and holding means unit is then rotated in a clockwise direction, as viewed from the rear of the reflector, thereby causing the ears 137, 138, 139 to engage the leading cam surfaces 151, and further clockwise rotation causing these ears 137, 138, 139 to snap into the axial recesses 150 on the reflector ears 147, 148, 149. The parts then assume the position shown in Figures 13, 21, and 23, in which the axial projections 105a on the lamp flange 46a are in engagement with the front faces of the end flanges 123a, 124a, 125a and are held in that position by the bias of the biasing means 135.

It will be evident that since the lamp flange 46a is accurately pre-positioned with respect to its distance from the filaments 88a, 89a, and the direction of the plane of the flange 46a is pre-positioned with respect to the axis of the lamp 40a, the filaments 88a, 89a will assume a desired predetermined position with respect to the reflector 41a when the parts are assembled as hereinbefore described. Also, it will be noted in the above connection that the ears 137, 138, 139 are interengageable with the recesses 150 in the reflector ears 147, 148, 149 in but one relative rotative relation.

It will be observed from Figures 18 and 21 that the ears 137, 138, 139 of the biasing means do not register with the sectoral projections, 102a, 103a, 104a, of the lamp flange as do the spring loops 92, 93, 94 in the embodiment of Figures 1 through 12, but on the contrary, are positioned circumferentially between the sectoral projections. The construction and arrangement of the biasing means 135 is in any event such that a desired sufficient equalization of bias on the projections 105 is attained.

The method of disconnection of the parts is evident from the hereinbefore described method of assembly.

Referring now to the embodiment shown in Figures 25 through 35. In this embodiment an incandescent electric lamp 40b, is also adapted to be connected to a mounting or reflector, 41b. With the exception of the fact that the lamp 40b has a positioning means 43b the collar 45b of which extends frontwardly from the flange 46b, instead of rearwardly, the lamp 40b is identical with the lamp 40a. As in the previously described embodiments, the flange 46b is adapted to be seated on the bottom of a rearwardly extending pocket 48b provided on the reflector 41b; and a holding means 49b, cooperating with the lamp flange 46b is provided for holding the lamp 40b assembled with the holding means 49b and with the reflector 41b.

The holding means comprises a shell 50b, desirably of generally cylindrical form, which may be seamless, and desirably formed of sheet metal. The shell 50b carries contacts 77b, 78b, constructed and arranged, for cooperation with lamp contacts 86b, 87b, the same as the contacts 77, 78 and the contacts 86, 87 of the embodiment of Figures 1 through 12. The contacts 77b, 78b and 86b, 87b serve to electrically connect conductors 79b, 80b to filaments 88b, 89b, as in the case of the embodiment of Figures 1 through 12, and hence no further description is required.

At its front end the shell 50b is provided with a generally annular end flange 152, which carries a plurality of concentrically arranged unequally circumferentially spaced connector pins 51b, 52b, 53b, desirably three. These connector pins 51b, 52b, 53b are all identical, and therefore a detailed description of one of them will serve for all. An enlarged view of one of the connector pins is shown in Figure 35, as it appears before assembly with the holding means 49b. Each connector pin is here indicated as hollow and as having a cylindrical shank 153, which is closed at its free end 154, and, before assembly with the holding means 49b, is of uniform cross-section. At the front end the pins are provided with heads 155 having a cylindrical portion 156, the cylindrical portion being joined to the shank 153 by a frustro-conical portion 157. The free end of the head 156 is here shown as provided with a rounded margin 158.

The shanks 153 of the pins 51b, 52b, 53b are snugly but slidably disposed through apertures 159 in a biasing means 160. The biasing means 160 is shown in Figure 27, developed in a plane, as it appears before it is completely formed and assembled as a part of the holding means 49b. The biasing means 160 includes an annular part 161 having radially outwardly extending projections 162a, 163a, 164a, here shown as provided, in their slightly wider free ends, with bayonet type apertures each having a wider entrance portion 165 and a narrower seat portion 166. For cooperation with these bayonet type apertures the flange is provided with three T-shaped radial projections, the cross arm 167 of the T being adapted to pass through the wider aperture portion 165 of the bayonet type slots in the projections 162a, 163a, 164a, whereas the leg 168 of the T is adapted to fit in the seat portion 166. The T-shaped projections 167, 168 on the flange 152 are here shown as extending radially from wider bases 169, themselves extending radially from the flange 152.

The biasing means 160 is provided with three frontwardly axially extending projections or detents 170, here shown as of generally hemispherical form and conveniently formed by making depressions 171 in the opposite face of the biasing means. These detents are here shown as located near the outer margin of the portion 161, near the circumferentially counter clockwise side of the radially extending projections 162a, 163a, 164a.

The flange 152 is provided with three apertures 172 adapted to snugly but slidably receive the shanks 153 of the connector pins 51b, 52b, 53b. These apertures 172, and the apertures 159 in the biasing means 160, are adapted to be alined with each other. In order to assemble the biasing means 160 with the flange 152, the radially extending projections 162a, 163a, 164a, as shown in Figure 27, are bent radially inwardly to form spring loops 162, 163, 164, the ends 173 of which extend frontwardly in a generally axial direction. The biasing means 160 is then so related to the flange 152 that the set of apertures 159 is in alinement with the set of apertures 172. The larger portions 165 of the bayonet type slots are passed over the cross arms 167 of the T-shaped projections, to bring the seats 166 of the bayonet type slots against the front faces of the leg portions 168 of the T-shaped projections. The connector pins 51b, 52b, 53b may then be passed through the alined sets of apertures 159 and 172, to the position shown in Figure 29, in which the small ends of the frustro-conical portions 157 are in abutment with the margins of the apertures 159 in the annular portion 161 of the biasing means, and the annular portion 161 has been moved somewhat toward the front face of the flange 152 to put the biasing means 160 under a predetermined stress. The free ends of the connector pins 51b, 52b, 53b are then transversely locally squeezed or swedged to form laterally extending projections 174 which are adapted to engage the rear face of the flange 152, under the bias of the biasing means 160. The holding means 49b then has the appearance as shown in Figures 28 and 29.

The reflector pocket 48b has a cylindrical portion 117b and a plane bottom or end flange 118b which is fragmentary in form. The end flange 118b has a central aperture 119b which is slightly larger than the circle defining the periphery of the portion 101b of the lamp flange 46b. The end flange 118b is fragmentarily cut away to form radially extending recesses 120b, 121b, 122b. These recesses leave the end flange 118b in the form of three segmental end flanges 123b, 124b, 125b, the front surfaces of which, at least, define a single plane. The rear faces of the end flanges 123b, 124b, 125b are flush with a plane defining the rear end of the cylindrical portion 117b of the reflector pocket. The end flanges 123b, 124b, 125b are of such width and position as to be registrable with the sectoral projections 102b, 103b, 104b.

Each end flange is provided with a recess or aperture 175, these apertures 175 being so located in the end flanges as to be complementary to the hemispherical detents 170 when the sectoral projections 102b, 103b, 104b of the lamp 40b are in alinement or registry with the end flanges 123b, 124b, 125b of the reflector pocket.

The lamp 40b may be assembled with the holding means 49b by cooperation between the compound apertures 107b, 108b, 109b and the connector pins 51b, 52b, 53b of the holding means 49b in exactly the same manner as has already been described in connection with the lamp 40a and the holding means 49a of the embodiment of Figures 13 through 24. The parts then have the position shown in Figures 30 and 31. The biasing means 160 acts to press the seat portions 143b of the compound apertures 107b, 108b, 109b firmly against the frustro-conical portions 157 of the connector pins 51b, 52b, 53b.

The assembled lamp, 40b, and holding means, 49b, now constitute a unit which is adapted to be in turn assembled with the reflector 41b. The unitary lamp and holding means are brought into axial alinement with the aperture 119b in the reflector, with the bulb facing the rear of the reflector, the unit is rotationally so positioned that the sectoral projections 102b, 104b will straddle the end flange 123b and the lamp is moved axially forward through the reflector aperture 119b, the sectoral projections 102b, 103b, 104b passing respectively through the recesses 121b, 122b, 120b, and the front face of the annular portion 161 coming into contact with the rear end face of the reflector pocket 48b. The unit is then moved frontwardly sufficiently, meanwhile flexing the spring loops 162, 163, 164, so that the sectoral projections 102b, 103b, 104b will clear the end flanges 123b, 124b, 125b. The lamp and holding means unit are then rotated in a clockwise direction, as viewed from the rear of the reflector, the hemispherical detents 170 meanwhile being cammed rearwardly by the leading margins of the end flanges 123b, 124b, 125b of the reflector pocket, continued clockwise rotation eventually causing the hemispherical detents 170 to snap into the apertures 175 in the end flanges. The parts then assume the position shown in Figures 25, 33, and 34, in which the axial projections 105b on the lamp flange 46b are in engagement with the front faces of the end flanges 123b, 124b, 125b, and are held in that position by the bias of the biasing means 160.

It will be noted that when the parts are assembled, the connector pins 51b, 52b, 53b, and the set of axial projections 105b, and the spring loops 162, 163, 164 are respectively in radial alinement and hence, due to the unequal circumferential spacing of these parts, it may be desirable to make the spring loops 164, 164 each narrower than the spring loop 162, if equalization of pressure on the projections 105b is desired.

It will be evident that since the lamp flange 46b is accurately pre-positioned with respect to its distance from the filaments 88b, 89b, and the direction of the plane of the flange is pre-positioned with respect to the axis of the lamp, the filaments will assume a desired predetermined position with respect to the reflector 41b when the parts are assembled as hereinbefore described. Also, in this connection, it will be noted that the detents 170 are interengageable with the apertures 175 in the end flanges in but one relative rotative relation.

Referring now to the embodiment shown in Figures 36 through 38. In this embodiment an incandescent electric lamp 40c is adapted to be connected to a mounting or reflector 41c. The lamp 40c is provided with a base 42c, which in this instance includes laterally extending positioning means 43c also forming part of the means for connecting the lamp to the reflector 41c. The lamp 40c is here shown as identical with the lamp 40a of the embodiment of Figure 13, and accordingly the positioning means 43c corresponds to the positioning means 43a of the lamp 40a, and the flange 46c is adapted to be seated on the bottom of a rearwardly extending pocket 48c provided on the reflector 41c; and a holding means 49c cooperating with the lamp flange 46c, is adapted to hold the lamp 40c assembled with the holding means 49c and with the reflector 41c, as will more fully appear.

The holding means comprises a shell 50c, and, similarly to the shell 50a, the shell is provided at its front end with an annular radial flange 127c, which carries a plurality of concentrically arranged unequally circumferentially spaced connector pins 51c, 52c, 53c, desirably three. The connector pins 51c, 52c, 53c have heads 155c similar to the heads 155 of the connector pins 51b, 52b, 53b of the embodiment of Figures 25 through 35, and accordingly no further description of the heads is necessary. However, in this instance the connector pins 51c, 52c, 53c are shown as solid and as having shanks 153c provided with reduced ends 177 fitting in apertures 178 in the radial flange 127c. The reduced ends 177 are fixed to the radial flange 127c by riveting as at 179. The shanks 153c of the pins 51c, 52c, 53c are snugly but slidably disposed through registering apertures 134c in a biasing means 135c, here shown as including an annulus 136c of spring sheet metal having three radially outwardly extending ears 137c, 138c, 139c, the ears being disposed similarly to the ears 137, 138, 139 of the biasing means 135 of the embodiment of Figure 13, but are here shown as somewhat narrower circumferentially and somewhat longer radially. In addition, the ears 137c, 138c, 139c are normally offset rearwardly out of the general plane of the annulus 136c, as may be seen particularly in Figure 37. The central aperture 140c of the annulus 136c is made of sufficient diameter so that it will clear the collar 45c of the positioning means 43c. It will of course be evident that in the present embodiment the biasing means 135c will be assembled with the shanks 153c of the connector pins 51c, 52c, 53c before the connector pins are riveted to the radial flange 127c.

The rear end of the shell 50c is here shown as carrying an insulating member 66c which in turn carries spring pressed contacts 77c, 78c, the construction and arrangement of these parts being here shown as identical with the construction and arrangement of the similar parts in the embodiment of Figure 1, and requiring no further description.

It will be evident that by bringing the compound apertures in the flange 46c of the lamp 40c into registry with the heads of the connector pins 51c, 52c, 53c, and moving the lamp axially against the bias of the spring pressed contacts 77c, 78c, and then rotating the lamp clockwise, as viewed from the front thereof, to bring the frustro-conical portions 157c of the connector pins onto the seat portions 143c of the compound apertures, the lamp may be assembled with the holding means 49c and the parts will then have the appearance in side elevation as shown in Figure 37.

The reflector 41c may be identical with the reflector 41a of the embodiment of Figure 13, (the reflector 41a being shown in perspective in Figure 22), with the exception that the seats 150c (corresponding to the seats 150) will be made narrower, if, as shown in Figure 38, the ears 137c, 138c, 139c are narrower circumferentially than the ears 137, 138, 139.

It will be obvious from the foregoing that the assembled lamp 40c and holding means 49c may be assembled with the reflector 41c in a manner analogous to that already described in connection with the lamp 40a, holding means 49a, and reflector 41a of the embodiment of Figure 13, it being noted, however, that in this instance when the parts are brought to the assembled position, shown in Figure 36, the annulus 136c of the biasing means 135c, by reason of its location frontwardly of the radial flange 127c, will re-act rearwardly against the front face of the radial flange 127c, whereas in the embodiment of Figure 13 the annulus 136 of the biasing means 135 reacts rearwardly against the flared portions 142 of the pins 51a, 52a, 53a. Thus, in the embodiment of Figure 36, the biasing means not only biases the connector pins rearwardly but also the shell 50c.

It will be evident that when the parts are in either the position of Figure 37 or Figure 36, the spring pressed contacts 77c, 78c on the holding means 49c will be in cooperative relation with the contacts 86c, 87c on the lamp base 42c and thus current may be supplied to the filaments (not shown) of the lamp 40c, as already pointed out in connection with the previous embodiments.

It will be evident that, for reasons analogous to those stated in connection with the previous embodiments, the filaments of the lamp 40c will assume the desired predetermined position with respect to the reflector 41c when the parts are in the assembled position of Figure 36.

Referring now to the embodiment shown in Figures 39 through 41. In this embodiment an incandescent electric lamp 40d is adapted to be connected to a mounting or reflector 41d. In this embodiment the lamp 40d is identical with the lamp 40a used in the embodiment of Figure 13, and is cooperable with a reflector identical with the reflector 41c of the embodiment of Figure 36. Here too the lamp flange 46d is adapted to be seated on the bottom of a rearwardly extending pocket 48d provided on the reflector 41d, and a holding means 49d, cooperating with the lamp flange 46d, is provided for holding the lamp 40d assembled with the holding means 49d and with the reflector 41d.

The holding means 49d includes a shell 50d, similar to the shell 50a of the embodiment of Figure 13, provided with a radial flange 180 at its front end, but in this instance the radial flange 180 is provided with three radially extending unequally circumferentially spaced resilient ears 181, 182, 183, so that, in front elevation, as shown in Figure 41, the flange 180 with the ears 181, 182, 183 appears similar to the biasing means 135c of the embodiment of Figures 36 through 38. The ears 181, 182, 183 are normally slightly offset rearwardly from the general plane of the radial flange 180, as may be seen best in Figure 40. The radial flange 180 is here shown as carrying three connector pins 51d, 52d, 53d, unequally circumferentially spaced to correspond to the spacing of the compound apertures in the lamp flange 46d. The connector pins 51d, 52d, 53d are here shown as identical with the connector pins 51c, 52c, 53c of the embodiment of Figures 36 through 38 and are accordingly fixedly mounted on the flange 180 by riveting.

The shell 50d carries at its rear end an insulating member 66d which in turn carries spring pressed contacts 77d, 78d, these parts being here shown as constructed and arranged identically with the corresponding parts of the embodiment of Figure 1.

It will be obvious that when it is desired to assemble the lamp 40d with the holding means 49d the compound apertures of the lamp flange 46d are brought into registry with the heads of the connector pins 51d, 52d, 53d, the lamp being moved axially against the bias of the spring pressed contacts 77d, 78d and then rotated in a clockwise direction, as viewed from the front, the parts being then in the position shown in Figure 40, in which the spring pressed contacts 77d, 78d act to press the frustro-conical portions 157d of the pins against the seat portions 143d of the compound apertures of the lamp flange 46d.

The lamp 40d and holding means 49d having been assembled, they may be assembled with the reflector 41d in a manner which is obvious from what has already been stated in connection with the embodiments of Figures 13 and 36, thus bringing the parts to the position shown in Figure 39, in which the filaments (not shown) of the lamp 40d are in the desired predetermined relation with respect to the reflector 41d. In both the position of the parts shown in Figure 39 and Figure 40, the spring pressed contacts 77d, 78d are in cooperative relation with the lamp contacts 86d, 87d.

Referring now to the embodiment shown in Figures 42 through 46. In this embodiment an incandescent electric lamp 40e is adapted to be connected to a mounting or reflector 41e. The lamp 40e is provided with a base 42e which includes laterally extending positioning means 43e also forming part of the means for connecting the lamp to the reflector 41e. The laterally extending portion of the base comprises a collar 45e, surrounding the shell 44e, and a radial extending flange 46e on the collar 45e, which in this instance extends from the rear end of the collar 45e. The lamp flange 46e is identical with the lamp flange 46a shown in Figure 17, and is adapted to be seated on the bottom of the rearwardly extending pocket 48e provided on the reflector 41e; and a holding means 49e, cooperating with the lamp flange 46e, is provided for holding the lamp 40e assembled with the holding means 49e and with the reflector 41e, as will more fully appear.

The holding means comprises a shell 50e, which in this instance is of somewhat smaller diameter than the shell 50a of the embodiment of Figure 13, but sufficiently large to permit reception of the shell 44e of the lamp base. At its front end the shell 50e is provided with an annular radial flange 184 provided with three unequally circumferentially spaced radially extending resilient ears 185, 186, 187. The ears 186, 187 are here shown as less than 120° apart, and the axis of symmetry of the ear 185 as bisecting the angle between the axes of symmetry of the ears 186, 187. The ears 185, 186, 187 are here shown as offset, at their radially inner ends, rearwardly from the general plane of the radial flange 184, but the ears as a whole are each normally inclined frontwardly, as may be best seen in Figure 43, when the holding means 49e and lamp 40e are disassembled from the reflector 41e. The ears 185, 186, 187 are provided with frontwardly extending dome shaped projections or detents 188, conveniently formed by making indentations 189 in the rear faces of the ears.

The holding means 49e carries a plurality of concentrically arranged unequally circumferentially spaced connector pins 51e, 52e, 53e, for cooperation with the compound apertures of the lamp flange 46e. These connector pins 51e, 52e, 53e are identical with the connector pins 51c, 52c, 53c of the embodiment of Figure 36, for example, with the exception that the shanks 153e of the pins are shorter. It will be noted that the connector pins 51e, 52e, 53e are here shown as mounted on the radial flange 184 in a position displaced clockwise from the radial axes of symmetry of the ears 185, 186, 187.

At its rear end the holding means 49e carries an insulating member 66e which in turn carries spring pressed contacts 77e, 78e, the construction and arrangement of these parts being here shown as identical with that of the corresponding parts of Figure 1.

It will be evident that when it is desired to assemble the lamp 40e with the holding means 49e, the compound apertures of the lamp flange 46e are brought into registry with the heads of the connector pins 51e, 52e, 53e, the lamp being moved axially against the bias of the spring pressed contacts 77e, 78e and then turned in a clockwise direction, as viewed from the front, to a position in which the frusto-conical portions 157e of the heads of the pins are seated in the seat portions 143e of the compound apertures of the lamp flange 46e, the parts being then in the position shown in Figure 43. In this position of the parts the detents 188 resiliently bear, to a desired extent, against the rear face of the lamp flange 46e.

The reflector 41e is here shown as identical with the reflector 41b of the embodiment of Figure 25, shown in detail in Figure 32, with the exception that the apertures 175e are located slightly differently from the apertures 175, for proper cooperation with the detents 188.

It will accordingly be evident that after the lamp 40e and holding means 49e have been assembled with each other, they may be assembled with the reflector 41e in a manner anologous to that already described in connection with the embodiment of Figure 25, it being noted that in this instance, as the sectoral projections 102e, 103e, 104e of the lamp flange 46e are passed through the recesses 121e, 122e, 120e respectively, the ears 185, 186, 187 will bear against the rear end surface of the cylindrical portion 117e of the reflector pocket 48e, the ears 185, 186, 187 being flexed rearwardly as the lamp is pushed axially frontwardly during the assembling operation. After the lamp flange 46e has been passed through the reflector, the assembled lamp and holding means are rotated in a clockwise direction, as viewed from the rear of the reflector, the detents 188 riding up onto the rear faces of the end flanges 123e, 124e, 125e, continued rotation causing the detents to snap into the seats formed by the apertures 175e, the parts being then in the position shown in Figures 42, 45, and 46.

It will be evident from the foregoing that when the parts are in this assembled position the filaments 88e, 89e of the lamp 40e will be in the desired predetermined position with respect to the reflector 41e.

Referring now to the embodiment shown in Figures 47 through 52. In this embodiment an incandescent electric lamp 40f is adapted to be connected to a mounting or reflector 41f. The lamp 40f is provided with a base 42f, which includes laterally extending positioning means 43f also forming part of the means for connecting the lamp to the reflector 41f. The positioning means 43f includes a radially extending flange 46f at the rear end of a collar 45f surrounding the lamp base shell 44f, the flange 46f being identical with the flange 46a of the lamp of the embodiment of Figure 13, shown in detail in Figure 17, with the exception that the compound apertures 107f, 108f, 109f of the lamp flange 46f, instead of having their seat portions 143f disposed in radial alinement with the axial projections 105f, (as is in the case of the seat portions 143, with respect to the projections 105), they have their seat portions 143f disposed a predetermined amount counter clockwise from the radii defining the axial projections 105f.

The holding means 49f includes a cylindrical shell 50f of a size such as described in the embodiment of Figure 42, and at the front end of this shell is provided an annular radial flange 190, here shown as having three radial projections 191, 192, 193 unequally circumferentially spaced, the radial projections 191, 192, 193 being in turn provided at their ends with circumferentially extending resilient arms 194, here shown as of equal length. The circle defining the peripheral margins of the arms 194 is here shown as equal in diameter to the circle defining the peripheral arcs of the sectoral projections 102f, 103f, 104f of the lamp flange 46f. The arms 194 are normally inclined frontwardly, as may be seen in Figure 48. The arms 194 are here shown as provided at their ends with axially frontwardly extending dome shaped projections or detents 195 conveniently formed by making indentations 196 in the rear faces of the arms. Owing to their relation to the projections 191, 192, 193, the detents 195 are unequally circumferentially spaced. The radial projections 191, 192, 193 on the annular flange 190 are here shown as carrying three connector pins 51f, 52f, 53f, these connector pins being of the same form as the connector pins 51c, 52c, 53c of the embodiment of Figure 36, and they are likewise rigidly fastened to the radial projections 191, 192, 193. The circumferential arrangement of the connector pins 51f, 52f, 53f is of course such that they are cooperable with the compound apertures in the lamp flange 46f. Owing to the illustrated relationship of the parts in this embodiment, the connector pins 51f, 52f, 53f, while similar to the pins 51c, 52c, 53c of the embodiment of Figure 36, have longer shanks, 153f.

The holding means 49f carries at its rear end an insulating member 66f in turn carrying spring pressed contacts 77f, 78f, these parts being constructed and arranged identically with the similar parts of the embodiment of Figure 1.

It will be evident that when it is desired to assemble the lamp 40f with the holding means 49f the compound apertures in the lamp flange 46f will be brought into registry with the connector pins 51f, 52f, 53f, the lamp being moved axially against the bias of the spring pressed contacts 77f, 78f and against the bias of the resilient arms 194, and then rotated clockwise, as viewed from the front, until the frustro-conical portions 157f of the heads of the pins become seated on the seat portions 143f of the compound apertures. The parts then have the position shown in Figure 48, in which the detents 195 bear against the rear faces of the sectoral projections 102f, 103f, 104f of the flange 46f.

The reflector 41f is identical with the reflector of the embodiment of Figure 25, shown in detail in Figure 32, with the exception of a slightly different positioning of the apertures 175f (corresponding to the apertures 175) which are provided for cooperation with the detents 195.

It will be evident that the assembled lamp 40f and holding means 49f may be assembled with the reflector 41f in a manner analogous to that already described in connection with the previous embodiments, it being noted that as the lamp flange 46f is passed through the reflector, the spring arms 194 will bear against the rear faces of the end flanges 123f, 124f, 125f of the reflector as the assembled lamp and holding means are moved axially frontwardly, the arms being flexed. Rotation of the assembled lamp and holding means, in a clockwise direction as viewed from the rear of the reflector causes the detents to ride onto the rear faces of the end flanges 123f, 124f, 125f and continued rotation causes the detents 195 to snap into the apertures 175f, bringing the parts to the position shown in Figures 47, 51, and 52.

It will be evident that when the parts are in this assembled position the filaments (not shown) of the lamp 40f will be at the desired predetermined position with respect to the reflector.

With respect to all of the embodiments hereinbefore described, while the preferred mode of assembly is as has been set forth, that is, by first assembling the lamp and holding means and then assembling the assembled lamp and holding means with the reflector, it will be apparent that the lamp and holding means need not be first assembled with each other but the lamp may be positioned at the front of the reflector and the holding means at the rear thereof and then the connector pins of the holding means connected to the lamp flange, as will be obvious, to bring the lamp and reflector and holding means to the same finally assembled position, as already described in connection with each embodiment.

From the foregoing it will be apparent to those skilled in the art that the illustrated embodiments of my invention provide new and improved electric lighting devices and units, readily and conveniently constructed and assembled, and accordingly, accomplish the principal object of my invention. On the other hand, it also will be obvious to those skilled in the art that the illustrated embodiments of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. In combination: a mounting having an aperture; a plurality of projections extending radially inwardly from the margin of said aperture; an incandescent electric lamp having base-means provided with a lateral extension constructed and arranged to abut said projections, said lateral extension having a plurality of apertures; and holding means, having parts extending through said apertures in said lateral extension and engaging said lateral extension, said engaging parts being disposed radially inside of the locus of the radially inner margins of said projections, said holding means being constructed and arranged to press said lateral extension against said mounting.

2. In combination: a mounting having an aperture; a plurality of projections extending radially inwardly from the margin of said aperture; an incandescent electric lamp having base-means provided with a lateral extension constructed and arranged to abut said projections; and holding means, having parts extending in a direction transversely of said lateral extension engaging said lateral extension, said engaging parts being disposed radially inside of the locus of the radially inner margins of said projections, said holding means being constructed and arranged to press said lateral extension against said mounting.

3. In combination: a mounting having an aperture; a plurality of projections extending radially inwardly from the margin of said aperture; an incandescent electric lamp having base-means provided with a lateral extension comprising a plurality of circumferentially spaced radially outwardly extending projections abutting said mounting projections; holding means, having parts engaging said lateral extension, said parts being radially within the locus of the radially inner margins of said mounting projections, constructed and arranged to press said lateral extension against said mounting; and said lateral extension being so constructed and arranged with respect to said aperture that said outward projections may be inserted through the spaces between said mounting projections and rotated, while said engaging parts are in engagement with said lateral extension, to bring said outward projections into abutment with said mounting projections.

4. In combination: a mounting having an aperture; a plurality of projections extending radially inwardly from the margin of said aperture; an incandescent electric lamp having base-means provided with a lateral extension comprising a plurality of circumferentially spaced radially outwardly extending projections abutting said mounting projections; said lateral extension having a plurality of circumferentially spaced apertures; holding means, having parts engaging said lateral extension, said parts extending through said apertures in said lateral extension and being radially within the locus of the radially inner margins of said mounting projections, constructed and arranged to press said lateral extension against said mounting; and said lateral extension being so constructed and arranged with respect to said aperture that said outward projections may be inserted through the spaces between said mounting projections and rotated, while said engaging parts are in engagement with said lateral extension, to bring said outward projections into abutment with said mounting projections.

5. In combination: a mounting having an aperture; a plurality of projections extending radially inwardly from the margin of said aperture; an incandescent electric lamp having base-means provided with a lateral extension constructed and arranged to abut said projections; said lamp having contact means; and holding means carrying contact means cooperable with said lamp contact means, said holding means having parts engaging said lateral extension, said parts being disposed radially inside of the locus of the radially inner margins of said projections; said holding means being constructed and arranged through the intermediation of said engaging parts to press said lateral extension against said mounting.

6. In combination: a mounting; an incandescent electric lamp having a bulb provided with a base having a lateral extension, said base having contact means; said mounting having an aperture of sufficient size to permit passage of said bulb, and said lateral extension abutting said mounting radially outside of said aperture; said lateral extension having a plurality of apertures; removable contact means cooperable with said lamp base contact means; and holding means, including connector portions extending through said apertures in said lateral extension, constructed and arranged to hold said lateral extension in abutment with said mounting and to hold said removable contact means in cooperative relation with said lamp base contact means.

7. In combination: mounting means; an incandescent electric lamp having a bulb provided with a base having a lateral extension; said mounting means having an aperture of sufficient size to permit passage of said bulb, and said lateral extension abutting said mounting means radially outside of said aperture; said lateral extension having a plurality of apertures; holding means for receiving and holding said lamp separately from said mounting means; said lamp and said holding means comprising cooperating connecting means including connector portions extending through said apertures in said lateral extension; said mounting means and said connecting means comprising means so constructed and arranged as to hold said lateral extension in abutment with said mounting means.

8. In combination: mounting means; an incandescent electric lamp having a base provided with a lateral extension abutting said mounting means; said lateral extension having a plurality of circumferentially spaced apertures; holding means for holding said lateral extension in abutment with said mounting means, said holding means including connector portions extending through said apertures and being constructed and arranged to receive and hold said lamp separately from said mounting means so that said connected lamp and holding means constitute a unit rotatable about the axis of said lamp with respect to said mounting means; said mounting means and said unit comprising means so constructed and arranged that by cooperative engagement of said unit with said mounting means and by rotation of said unit with respect to said mounting means said unit is detachably connectible to said mounting means and when said unit is so connected said holding means holds said lateral extension in abutment with said mounting means.

9. In combination: mounting means; an incandescent electric lamp having a base provided with a lateral extension abutting said mounting means; contact means on said base; said lateral extension having a plurality of circumferentially spaced apertures; holding means for holding said lateral extension in abutment with said mounting means, said holding means including contact means cooperable with said contact means on said base and including also connector portions extending through said apertures, said holding means being constructed and arranged to receive and hold said lamp separately from said mounting means so that said connected lamp and holding means constitute a unit rotatable about the axis of said lamp with respect to said mounting means; said mounting means and said unit comprising means so constructed and arranged that by cooperative engagement of said unit with said mounting means and by rotation of said unit with respect to said mounting means said unit is detachably connectible to said mounting means and when said unit is so connected said holding means holds said lateral extension in abutment with said mounting means.

HARRY A. DOUGLAS.